Patented May 13, 1930

1,758,378

UNITED STATES PATENT OFFICE

WERNER SCHULEMANN, OF VOHWINKEL, NEAR ELBERFELD, AND FRITZ SCHÖNHÖFER AND AUGUST WINGLER, OF ELBERFELD, GERMANY, ASSIGNORS TO WINTHROP CHEMICAL COMPANY, INC., OF NEW YORK, N. Y., A CORPORATION OF NEW YORK

6-ALKOXY-8-AMINOQUINOLINES

No Drawing. Application filed December 5, 1927, Serial No. 237,978, and in Germany December 9, 1926.

The present invention is an improvement of the process of the application Ser. No. 85,030 for the manufacture of 6-alkoxy-8-aminoquinolines and consists in subjecting 6-alkoxy-quinoline-8-carboxylic acid amides to the Hofmann's decomposition (see A. Bernthsen Textbook of Organic Chemistry, London 1906, page 107, No. 5) that is to say by treating the acid amides with bromine and caustic alkalies.

In the earlier application the manufacture of 6-alkoxy-8-aminoquinolines is effected by reducing 8-nitro or 8-azo derivatives of 6-alkoxy-quinolines by the customary methods or by alkylating the hydroxyl oxygen of 6-hydroxy-8-aminoquinoline or its nitrogen substitution products and converting the nitrogen substitution derivatives of 6-alkoxy-8-aminoquinolines thus obtained into the respective free amino compounds if desired.

These compounds are now produced technically and in an excellent manner by subjecting 6-alkoxyquinoline-8-carboxylic acid amides to the Hofmann's reaction.

The following example will illustrate our invention:—

*Example.*—2 parts by weight of 6-methoxyquinoline-8-carboxylic acid amide (melting at 169–170° C.) are stirred into 110 parts of a solution, which contains per 1000 parts by weight of water 16 parts by weight of bromine and 32 parts by weight of caustic potash (80%). When the solution is complete the system is heated for half an hour over a naked flame, 10 to 15 parts by weight of a 32% solution of caustic soda being gradually added. An oil separates and the whole is extracted with ether. The etheral solution is dried and evaporated. The residue is then distilled.

6-methoxy-8-aminoquinoline prepared by this method boils at 135 to 138° C. under about 1 mm. pressure and is identical with the corresponding product of application Serial No. 85,030, filed Jan. 30, 1926.

We claim:

1. In the process for the manufacture of 6-alkoxy-8-aminoquinolines, the step which comprises subjecting 6-alkoxyquinoline-8-carboxylic acid amides to the Hofmann's decomposition by treating them with bromine and caustic alkali.

2. In the process for the manufacture of 6-methoxy-8-aminoquinoline the step which comprises subjecting 6-methoxyquinoline-8-carboxylic acid amide to the Hofmann's decomposition by heating it with bromine and caustic alkali.

3. In the process for the manufacture of 6-methoxy-8-aminoquinoline the step which comprises subjecting 6-methoxyquinoline-8-carboxylic acid amide to the Hofmann's decomposition by heating it with bromine and caustic potash.

In testimony whereof we have hereunto set our hands.

WERNER SCHULEMANN.
FRITZ SCHÖNHÖFER.
AUGUST WINGLER.